Jan. 1, 1935. P. J. BERGGREN 1,986,424
WEB THREADING DEVICE
Original Filed June 4, 1929

Per Johan Berggren
INVENTOR.
BY Darby & Darby
ATTORNEYS.

Patented Jan. 1, 1935

1,986,424

UNITED STATES PATENT OFFICE 1,986,424

WEB THREADING DEVICE

Per Johan Berggren, Chicago, Ill.

Original application June 4, 1929, Serial No. 368,352. Divided and this application May 5, 1933, Serial No. 669,525

9 Claims. (Cl. 88—17)

This application is a division of my application Serial No. 368,352 for "Motion picture cameras", filed June 4, 1929.

The invention relates to web threading mechanism for motion picture cameras and has for its object the provision of an improved motion picture camera, the structure of which is simple and efficient and wherein I have provided means to facilitate the threading of the film feeding mechanism.

A further object includes the provision of a film threading means to facilitate the threading of the film on the feeding device.

A further object includes a sliding guide plate which is readily movable out of and into film holding position so as to provide room for threading the film when the plate is moved out of its position.

Other objects will appear more fully hereinafter.

The invention consists substantially in the construction, combination, location and relative arrangement of parts, all as will be more fully set forth hereinafter and finally pointed out in the appended claims, and as is shown in the accompanying drawing; in which Figure 1 is a view in elevation of the movable guide plate and related parts with the feed mechanism omitted;

The same part is designated by the same reference numeral wherever it occurs throughout the several views.

Figure 2:
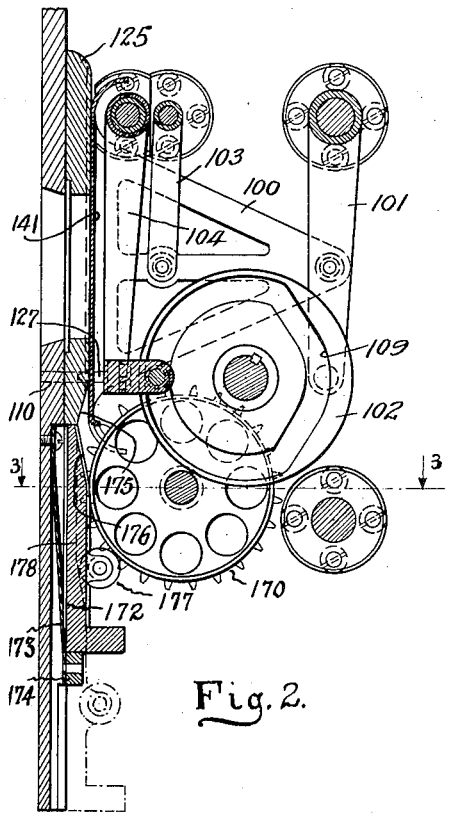
Fig. 2 is a view taken on the line 2—2 of Fig. 1 and showing my improved guide plate and related parts with the film feed mechanism in place.
Figure 1:
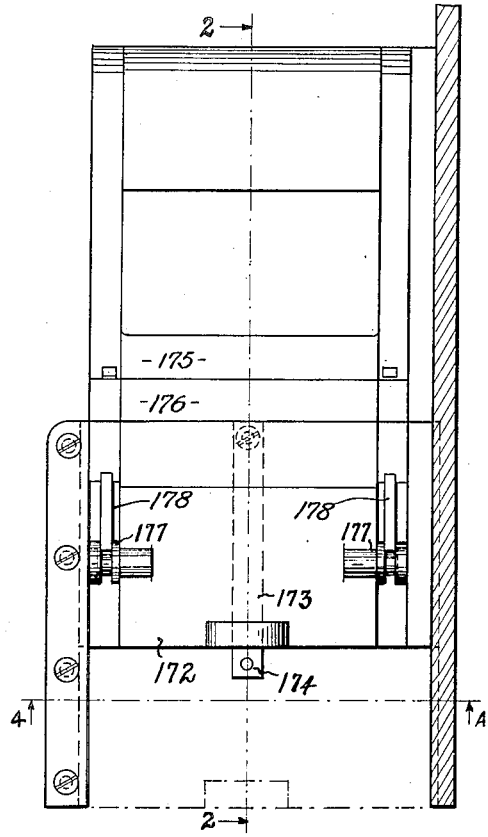
Figure 3:
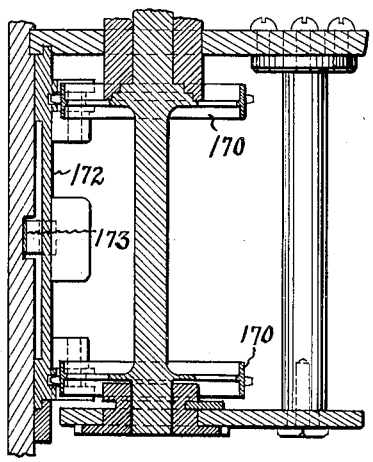
Fig. 3 is a view taken on the line 3—3 of Fig. 2.
Figure 4:
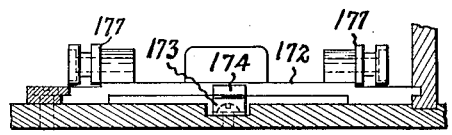
Fig. 4 is a view taken on the line 4—4 of Fig. 1 looking in the direction of the arrows.

It is among the special purposes of the invention to provide simple and efficient means for threading the film in a film feeding mechanism of moving picture cameras, such as I have fully described in my original application above acknowledged, and of which the present application is a division.

It will be understood that the film is fed through the camera by any suitable or well-known type of film feeding mechanism, such as the intermittent sprocket 170. In this type of moving picture cameras it is desirable to facilitate the threading of the film around the feed device and to efficiently hold it upon the intermittent sprocket feed. To accomplish this, I provide a shiftable guide plate 172, which is mounted to slide in suitable guides found in the camera casing at a point opposite the intermittent sprocket. The guide plate 172 forms an extension of the aperture plate 125. This guide plate when in raised position serves to hold the film in engagement with the teeth of the intermittent sprocket. For this purpose, presser rollers 177 are mounted upon the guide plate and the film passes between these rollers and the sprockets. The teeth of the sprockets project into the grooves 178 of the guide plate. In order to initially thread the film over the sprocket, the guide plate 172 is lowered; that is, the plate is withdrawn so as to afford space for the film to clear the sprocket teeth. When the film is passed partially around the sprocket with the sprocket teeth properly engaging in the perforations of the film, the guide plate is raised into normal position thereby bringing the rollers into position to press and hold the film in its engagement with the sprocket.

This guide plate is retained in its raised position by detent 174, which is carried by a spring 173. When the detent is depressed the guide plate may readily be moved from its permanent position to its temporary position indicated by dotted lines in Fig. 2, thereby affording space for the film to be threaded over the sprockets of the intermittent film moving mechanism. When the film is in place the guide plate is moved in its raised position thereby holding the film on the sprockets.

As disclosed in the parent application, of which this case is a division, a frame 100 is pivotally suspended on the links 101 and 103 and supports the presser plate 141 so that the driving cam 102 acting on lever 101 will intermittently move the presser plate towards and away from the aperture plate. When the presser plate 141 is moved towards the aperture plate the film is pressed outwardly against the aperture plate and held firmly at the opening thereof during the projection of the picture. The centering pins 127 are mounted on the ends of the pivotally mounted levers 104 and are actuated towards and away from the aperture plate by means of a groove 109 on one side of the cam 102. The aperture plate is provided with holes 110 into which the centering pins 127 may pass, as is clear from Fig. 2 when they are acting to center and hold the film in place during periods of rest thereof.

Beginning just at the holes 110 and extending to the bottom edge of the aperture plate the surface thereof is beveled, as indicated at 175.

Likewise, beginning at the point where the teeth of the sprocket 170 enter the grooves 178 of the slidable plate 172 and extending to the upper edge thereof the face of the plate is beveled, as indicated at 176. These two beveled surfaces converge at the edges of contact of the aperture plate 125 and the slidable plate 172 when the slidable plate is in raised position, as clearly indicated in Fig. 2. These beveled surfaces provide a space between the centering pins 127 and the engaged sprocket teeth of the sprocket wheel 170 for a very definite and necessary purpose.

It is a well known fact that motion picture film is continually shrinking and for that reason it is practically impossible to construct the apparatus so that the distance between the centering pins 127 and the engaging sprocket teeth of the sprocket 170 will be correct for films of all ages. However, as is clear, this distance in any particular apparatus is fixed. In accordance with this invention, to compensate for the variations in film length between any pairs of sprocket perforations, the distance between the registering pins 127 and the sprocket teeth is set to a minimum position. When a new perforated film, which as yet has not materially shrunk, is used in the apparatus the distance between any pairs of perforations is at a maximum. Thus there will be a surplus of film between the centering or registering pins 127 and the engaging teeth of the sprocket 170. With the structure as disclosed the space provided by the beveled surfaces 175 and 176 absorbs this excess length without straining the film and without interfering with the proper action of the apparatus. As the film shrinks the length of film to be absorbed by the space becomes less and less, but since the distance between the centering pins 127 and the engaging teeth of the sprocket 170 is a minimum, the film never shrinks to a point where it will be damaged. Without this invention the damage which usually occurs is that the centering pins form new perforations, or, to be more exact, enlarge the original perforations by cutting away the edges thereof. However, by means of this invention, these difficulties are eliminated with a simple mechanism which does not require any special adjustments or any special allowance for films of varying ages.

It will be seen that I provide an exceedingly simple and efficient web threading device whereby the film or motion picture web may be readily threaded on the feed device and held in position.

It will be understood, of course, that variations and changes in the details of the construction and arrangement of parts may readily occur to those skilled in the art which fall within the spirit and scope of my invention.

What I claim as new and useful and of my own invention is:

1. In a motion picture camera, an aperture plate, film feeding mechanism including an actuating sprocket, a slidable plate forming an extension of the aperture plate and positioned opposite said sprocket so that when the slidable plate is lowered away from the aperture plate space is afforded for threading the film on the sprocket, and means for holding the slidable plate in raised position to positively engage the film with the sprocket wheel.

2. In a motion picture camera, an aperture plate, film feeding mechanism including an actuating sprocket, a plate slidably mounted below the aperture plate in the plane thereof and opposite the sprocket, said plate when slid downwardly affording space to thread the film onto the sprocket and when moved upwardly firmly engaging the film with the sprocket, and means for holding said plate in raised position.

3. In a motion picture camera, an aperture plate, film feeding mechanism including an actuating sprocket, a plate slidably mounted below the aperture plate in the plane thereof and opposite the sprocket, said plate when slid downwardly affording space to thread the film onto the sprocket and when moved upwardly firmly engaging the film with the sprocket, and means for holding said plate in raised position, said slidable plate having grooves on the face thereof in which the teeth of the sprocket move when said plate is in raised position.

4. In a motion picture camera, an aperture plate, film feeding mechanism including an actuating sprocket, a plate slidably mounted below the aperture plate in the plane thereof and opposite the sprocket, said plate when slid downwardly affording space to thread the film onto the sprocket and when moved upwardly firmly engaging the film with the sprocket, means for holding said plate in raised position, and guide rollers mounted on the slidable plate for pressing the film against the sprocket wheel when said plate is in raised position.

5. In a camera, an aperture plate, a film feeding mechanism including an actuating sprocket, a plate slidably mounted below the aperture plate in the plane thereof, the slidable plate being positioned adjacent the lower edge of the aperture plate and movable therefrom, means for holding the slidable plate adjacent the aperture plate, said sprocket being mounted adjacent the slidable plate so that when the slidable plate is lowered space is provided for threading the film on the sprocket, the adjacent edges of the aperture plate and the slidable plate being beveled to provide a space, and means on the slidable plate for holding the film against the sprocket wheels when said plate is in locked position.

6. In a motion picture camera, an aperture plate, film feeding mechanism including an actuating sprocket, a plate slidably mounted below the aperture plate and in the plane thereof, said slidable plate being positioned opposite said sprocket when in raised position with its upper edge adjacent the lower edge of the aperture plate, the lower edge of the aperture plate and the upper edge of the slidable plate being beveled, and means for centering the film in the aperture.

7. In a motion picture camera, an aperture plate, film feeding mechanism including an actuating sprocket, a plate slidably mounted below the aperture plate and in the plane thereof, said slidable plate being positioned opposite said sprocket when in raised position with its upper edge adjacent the lower edge of the aperture plate, the lower edge of the aperture plate and the upper edge of the slidable plate being beveled, and means for centering the film in the aperture, said slidable plate having grooves on the face thereof in which the teeth of the sprocket wheel move.

8. In a motion picture camera, an aperture plate, film feeding mechanism including an actuating sprocket, a plate slidably mounted below the aperture plate and in the plane thereof, said slidable plate being positioned opposite said sprocket when in raised position with its upper edge adjacent the lower edge of the aperture plate, the lower edge of the aperture plate and the upper edge of the slidable plate being beveled, means for centering the film in the aperture, and rollers mounted on the slidable plate for holding the film against the sprocket wheel when said plate is in raised position.

9. In a motion picture camera, an aperture plate, film feeding mechanism including an actuating sprocket, a plate slidably mounted below the aperture plate and in the plane thereof, said slidable plate being positioned opposite said sprocket when in raised position with its upper edge adjacent the lower edge of the aperture plate, the lower edge of the aperture plate and the upper edge of the slidable plate being beveled, means for centering the film in the aperture, rollers mounted on the slidable plate for holding the film against the sprocket wheel when said plate is in raised position, and means for locking the slidable plate in raised position.

PER JOHAN BERGGREN.